United States Patent
Kim et al.

(10) Patent No.: US 12,019,581 B2
(45) Date of Patent: Jun. 25, 2024

(54) MULTI-CORE PROCESSOR AND STORAGE DEVICE

(71) Applicant: SAMSUNG ELECTRONICS CO., LTD., Suwon-si (KR)

(72) Inventors: Hyungjin Kim, Seoul (KR); Jinmyung Yoon, Yongin-si (KR); Youngmin Lee, Seoul (KR); Dasom Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/936,995

(22) Filed: Sep. 30, 2022

(65) Prior Publication Data

US 2023/0195688 A1 Jun. 22, 2023

(30) Foreign Application Priority Data

Dec. 17, 2021 (KR) .................. 10-2021-0181443

(51) Int. Cl.
*G06F 15/80* (2006.01)
*G06F 12/02* (2006.01)
(Continued)

(52) U.S. Cl.
CPC ............ *G06F 15/80* (2013.01); *G06F 12/023* (2013.01); *G06F 12/0284* (2013.01);
(Continued)

(58) Field of Classification Search
CPC ............ G06F 12/023; G06F 12/0284; G06F 12/1054; G06F 2212/68; G06F 13/1663
See application file for complete search history.

(56) References Cited

U.S. PATENT DOCUMENTS

| 6,574,700 B2 | 6/2003 | Miura et al. |
| 7,069,398 B2 * | 6/2006 | Lin ............ H04L 27/2647 370/208 |

(Continued)

FOREIGN PATENT DOCUMENTS

| EP | 2271992 A4 | 1/2012 |
| JP | 2003-044355 | 2/2003 |

(Continued)

OTHER PUBLICATIONS

Partial Search Report dated Apr. 6, 2013 in corresponding Application No. EP 22212830.8.

(Continued)

*Primary Examiner* — Stephanie Wu
(74) *Attorney, Agent, or Firm* — F. Chau & Associates, LLC

(57) ABSTRACT

A multi-core processor includes a plurality of cores, a shared memory, a plurality of address allocators, and a bus. The shared memory has a message queue including a plurality of memory regions for transmitting messages between the plurality of cores. The plurality of address allocators are configured to, each time addresses in a predetermined range corresponding to a reference memory region among the plurality of memory regions are received from a corresponding core among the plurality of cores, control the plurality of memory regions to be accessed in sequence by applying an offset determined according to an access count of the reference memory region to the addresses in the predetermined range. The bus is configured to connect the plurality of cores, the shared memory, and the plurality of address allocators to one another.

16 Claims, 11 Drawing Sheets

(51) Int. Cl.
*G06F 12/0806* (2016.01)
*G06F 12/1045* (2016.01)
*G06F 13/16* (2006.01)
*G06F 15/163* (2006.01)
*G06F 15/167* (2006.01)

(52) U.S. Cl.
CPC ...... *G06F 12/0806* (2013.01); *G06F 12/1054* (2013.01); *G06F 13/1663* (2013.01); *G06F 15/163* (2013.01); *G06F 15/167* (2013.01); *G06F 2212/68* (2013.01)

(56) References Cited

U.S. PATENT DOCUMENTS

| | | | |
|---|---|---|---|
| 9,098,462 B1* | 8/2015 | McNicholl | G06F 15/163 |
| 10,635,602 B2 | 4/2020 | Gschwind et al. | |
| 2005/0066080 A1 | 3/2005 | Duckman | |
| 2009/0216988 A1 | 8/2009 | Palladino | |
| 2012/0110298 A1 | 5/2012 | Matsuse | |
| 2012/0331240 A1* | 12/2012 | Sauermann | G06F 15/167 |
| | | | 711/147 |
| 2015/0356022 A1 | 12/2015 | Leidel et al. | |
| 2019/0012269 A1* | 1/2019 | Bubb | G06F 3/0629 |
| 2019/0206023 A1* | 7/2019 | Dimitrov | G06T 15/005 |
| 2019/0324692 A1 | 10/2019 | Kuwamura | |
| 2020/0142744 A1* | 5/2020 | Tolstsikau | G06F 9/5016 |

FOREIGN PATENT DOCUMENTS

JP 2008134917 6/2008
WO 2020005377 1/2020

OTHER PUBLICATIONS

Extended Search Report dated Jun. 22, 2023 in corresponding Application No. EP 22212830.8.
Kornaros Georgios et al: "Enabling Efficient Job Dispatching in Accelerator-extended Heterogeneous Systems with Unified Address Space", 2018 30th International Symposium on Computer Architecture and High Performance Computing (SBAC-PAD), IEEE, Sep. 24, 2018, pp. 180-188, XP033521329.
Examination Report dated Feb. 7, 2024 issued in corresponding EP Application No. 22212830.8.

* cited by examiner

MULTI-CORE PROCESSOR AND STORAGE DEVICE

CROSS-REFERENCE TO RELATED APPLICATION(S)

This application claims priority under 35 U.S.C. § 119 to Korean Patent Application No. 10-2021-0181443, filed on Dec. 17, 2021 in the Korean Intellectual Property Office, the disclosure of which is incorporated by reference herein in its entirety.

TECHNICAL FIELD

Example embodiments of the present disclosure relate to a multi-core processor and a storage device including the same.

DISCUSSION OF RELATED ART

Recently, the demand for multi-core processors has increased due to limitations in increasing performance of a single-core processor. In the past, research into performance increases through clock speed was actively conducted to increase performance of a processor. However, recently, research relating to a multi-core processor, for example, increasing performance by increasing the number of processing cores included in a multi-core processor, has been actively conducted.

A multi-core processor device may include a shared memory to perform inter-process communications (IPC). That is, a first core of a multi-core processor may store data to be processed by a second core of the multi-core processor in the shared memory. The second core may obtain data stored in the shared memory and may process the data.

SUMMARY

Example embodiments of the present disclosure provide a multi-core processor and a storage device including the same.

Example embodiments of the present disclosure provide a multi-core processor in which, by allowing cores to quickly access a shared memory, inter-process communication (IPC) between cores may be quickly performed.

According to an example embodiment of the present disclosure, a multi-core processor includes a plurality of cores, a shared memory, a plurality of address allocators, and a bus. The shared memory has a message queue including a plurality of memory regions that transmit messages between the plurality of cores. The plurality of address allocators are configured to, each time addresses in a predetermined range corresponding to a reference memory region among the plurality of memory regions are received from a corresponding core among the plurality of cores, control the plurality of memory regions to be accessed in sequence by applying an offset determined according to an access count of the reference memory region to the addresses in the predetermined range. The bus is configured to connect the plurality of cores, the shared memory, and the plurality of address allocators to one another.

According to an example embodiment of the present disclosure, a multi-core processor includes first and second cores that perform inter-process communication (IPC), a shared memory, and a first address allocator. The shared memory is shared by the first and second cores. The first address allocator is configured to perform an address translation operation for the first core to access the shared memory. The first core is configured to request a first message queue including a plurality of memory regions from the shared memory. When the first message queue is allocated to the shared memory, the first core repeatedly performs a store instruction for a reference memory region among the plurality of memory regions on a plurality of messages. The first address allocator is configured to perform the address translation operation such that the plurality of messages are able to be stored in the plurality of memory regions in sequence based on an access count of the first core with respect to the reference memory region.

According to an example embodiment of the present disclosure, a storage device includes a memory device configured to store data, and a storage controller configured to control the memory device. The storage controller includes a plurality of cores, a shared memory having a plurality of message queues that transfer messages between the plurality of cores, and a plurality of address allocators configured to perform address translation operations such that the plurality of cores are able to access the shared memory. One of the plurality of address allocators is configured to, when addresses for a reference memory region of one of the message queues are received from a corresponding core among the plurality of cores, perform the address translation operations such that a plurality of memory regions of the one message queue are accessed based on an access count of the reference memory region.

BRIEF DESCRIPTION OF THE DRAWINGS

The above and other features of the present disclosure will become more apparent by describing in detail example embodiments thereof with reference to the accompanying drawings, in which.

DETAILED DESCRIPTION

Figure 1:
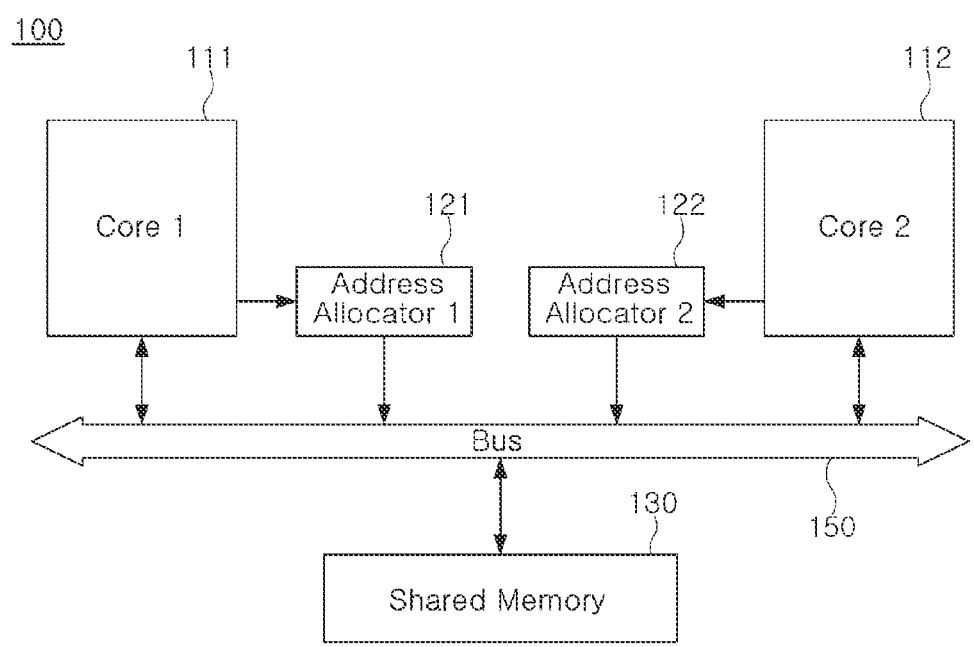
FIG. 1 is a block diagram illustrating a multi-core processor according to an example embodiment of the present disclosure.

Example embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an example embodiment may be described as a "second" element in another example embodiment.

It should be understood that descriptions of features or aspects within each example embodiment should typically be considered as available for other similar features or aspects in other example embodiments, unless the context clearly indicates otherwise.

As used herein, the singular forms "a", "an" and "the" are intended to include the plural forms as well, unless the context clearly indicates otherwise.

FIG. 1 is a block diagram illustrating a multi-core processor according to an example embodiment.

A multi-core processor in an example embodiment may include two or more cores. In the example illustrated in FIG. 1, the multi-core processor 100 may include a plurality of cores 111 and 112, a plurality of address allocators 121 and 122, and a shared memory 130. The plurality of cores 111 and 112, the plurality of address allocators 121 and 122, and the shared memory 130 may be connected to each other and may communicate with each other through a bus 150.

The plurality of cores 111 and 112 may perform tasks in a divided manner. In this case, the plurality of cores 111 and 112 may operate independently of each other. For the plurality of cores 111 and 112 to perform one task together, the plurality of cores 111 and 112 may exchange data with each other according to predetermined rules. For example, the first core 111 may provide a message to the second core 112 to request the second core 112 to perform an operation. Transmitting or receiving data between the plurality of cores 111 and 112 may be referred to as inter-process communication (IPC).

Each of the plurality of cores 111 and 112 may include a register. For example, data to be transmitted by the IPC or data received by the IPC may be stored in a register of each of the plurality of cores 111 and 112.

The plurality of cores 111 and 112 may be configured as the same type of cores. That is, the multi-core processor 100 in FIG. 1 may have a symmetric multi-processor (SMP) structure. For example, the plurality of cores 111 and 112 may be advanced RISC machine (ARM) cores, and each of the plurality of cores 111 and 112 may process an assigned task by units of instructions. However, example embodiments of the present disclosure are not limited thereto. For example, in an example embodiment, the plurality of cores 111 and 112 may be configured as different types of processors.

The shared memory 130 may be shared by the plurality of cores 111 and 112, and may support data transmission between the plurality of cores 111 and 112. For example, when the first core 111 stores data in the shared memory 130, the second core 112 may obtain the stored data from the shared memory 130 and may process the obtained data.

Each of the plurality of cores 111 and 112 may transmit a message to another core by a message queue method. For example, a message queue including a plurality of memory regions from the shared memory 130 may be allocated to the first core 111 to transfer a message to the second core 112. The first core 111 may store a plurality of messages in the plurality of memory regions. The second core 112 may obtain a plurality of messages by accessing the plurality of memory regions in sequence and may process the messages.

The plurality of memory regions may have addresses in different ranges. The first and second cores 111 and 112 may perform an address translation operation each time the plurality of memory regions having addresses in different ranges in sequence are accessed. When this occurs, computational overhead for message transfer between the first and second cores 111 and 112 may increase. This increase in computational load may cause degradation of performance of the multi-core processor 100.

In an example embodiment, the multi-core processor 100 may include a plurality of address allocators 121 and 122 that perform an address translation operation of each of the plurality of cores 111 and 112. When the first core 111 repeatedly performs an access instruction for a reference memory region among the plurality of memory regions, the first address allocator 121 may perform an address translation operation such that the plurality of memory regions may be accessed in sequence. For example, the first address allocator 121 may perform address translation by applying an offset determined according to an access count of the reference memory region to addresses of the reference memory region, such that the first address allocator 121 may control the first core 111 to access a memory region instructed by the addresses.

In an example embodiment, the plurality of cores 111 and 112 may access the plurality of memory regions in sequence by repeatedly performing an instruction to access the same memory region. Accordingly, the burden of performing an address translation operation each time to access the plurality of memory regions of the plurality of cores 111 and 112 in sequence may be reduced. For example, an instruction cycle utilized to perform an address translation operation in each of the plurality of cores 111 and 112 may be reduced. Accordingly, the performance of the multi-core processor 100 may increase.

Figure 2:
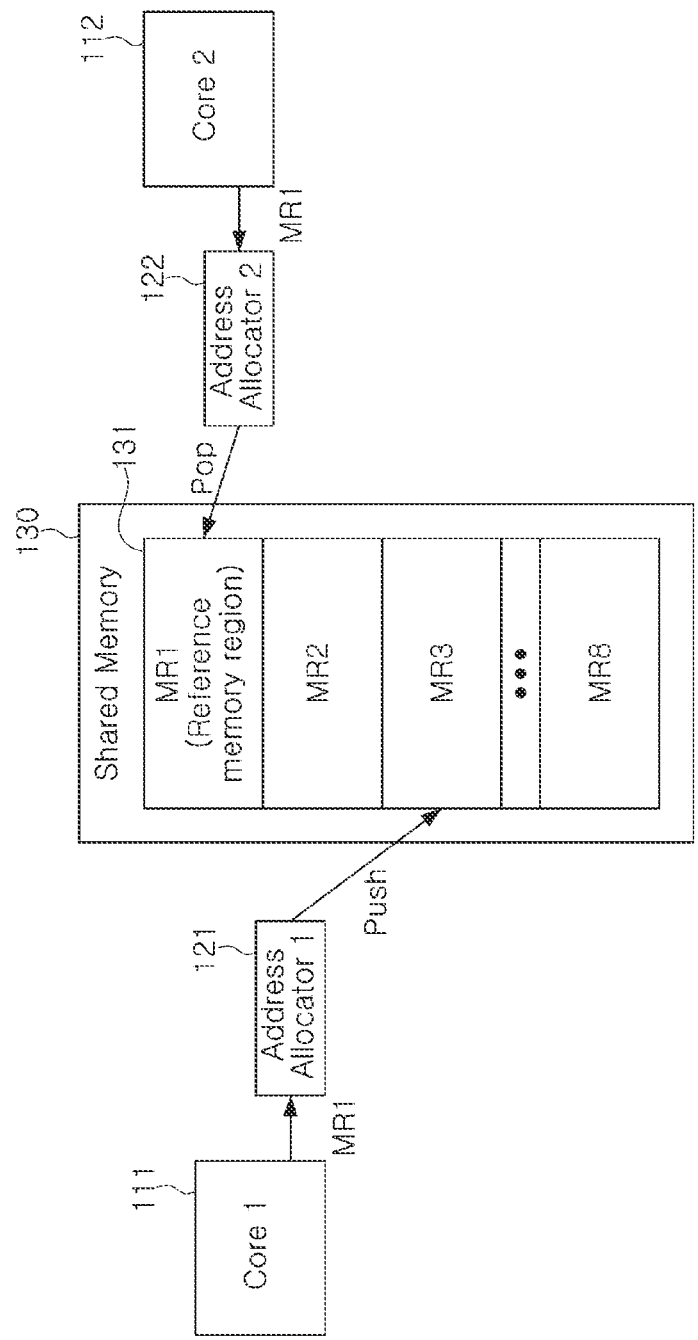
FIGS. 2 and 3 are block diagrams illustrating an inter-process communication (IPC) operation of a multi-core processor according to an example embodiment of the present disclosure.
Figure 3:
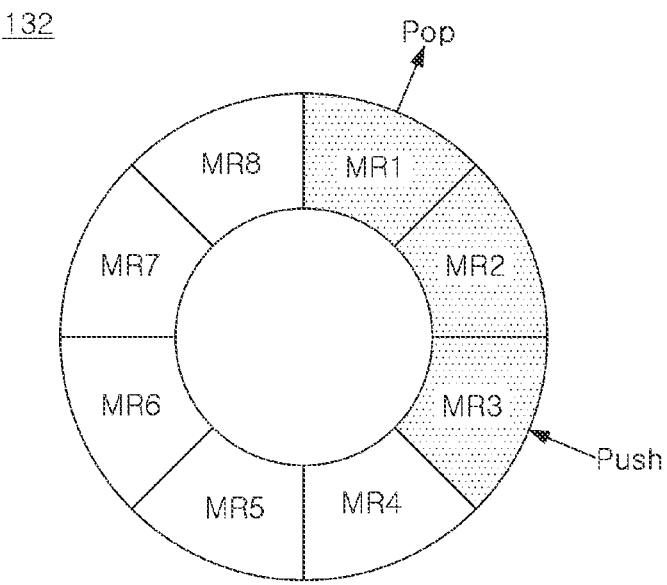

FIGS. 2 and 3 are block diagrams illustrating an inter-process communication (IPC) operation of a multi-core processor according to an example embodiment.

FIG. 2 illustrates first and second cores 111 and 112, first and second address allocators 121 and 122, and a shared memory 130 included in the multi-core processor 100 described with reference to FIG. 1. FIG. 2 illustrates an IPC operation of the multi-core processor 100 according to an example in which the first core 111 transmits a message to the second core 112.

The shared memory 130 may include a message queue 131. The message queue 131 may include a plurality of memory regions MR1-MR8. For example, memory regions MR1-MR8 having a predetermined address range from the shared memory 130 may be allocated in the first core 111 as the message queue 131 when the multi-core processor 100 is initialized.

Each of the plurality of memory regions MR1-MR8 may have addresses in different ranges. For example, the plurality of memory regions MR1-MR8 may have addresses in a continuous range. The plurality of memory regions MR1-MR8 may have the same size.

The first core 111 may provide a plurality of messages to be transferred to the second core 112 to the message queue 131. For example, the first core 111 may perform a store instruction to store the message stored in the internal register in the message queue 131. An operation in which the first core 111 provides a message to the message queue 131 may be referred to as a push operation.

Messages pushed from the first core 111 may be stored in sequence in the memory regions MR1-MR8 of the message queue 131. That is, each time a message is pushed, addresses of a memory region in which a message is stored may be different. The first core 111 may change an address for executing a store instruction each time the first core 111 pushes a message. When this occurs, computational load of the first core 111 may increase. For example, when a source code for pushing a message is compiled, an instruction for an address translation operation may be added to the instructions to be actually executed in the first core 111, and accordingly, the number of instruction cycles may increase.

In an example embodiment, the first core 111 may repeatedly provide a store instruction to the reference memory region to push messages, and the first address allocator 121 may perform an address translation operation for allowing messages to be stored in the plurality of memory regions MR1-MR8 in sequence according to the number of times the store instruction is provided.

For example, the reference memory region may be configured as a first memory region MR1, and the first memory region MR1 may be configured as a memory region having an address having the smallest value among the plurality of memory regions MR1-MR8. The first address allocator 121 may perform an address translation operation such that a memory region having a predetermined offset from the reference memory region may be accessed each time a store instruction for the reference memory region is provided.

The second core 112 may access the shared memory 130 and may obtain a plurality of messages transferred from the first core 111 from the message queue 131. For example, the second core 112 may perform a load instruction for loading a message stored in the message queue 131 into an internal register. An operation in which the second core 112 accesses the shared memory 130 and obtains a message from the message queue 131 may be referred to as a pop operation.

Messages stored in the memory regions MR1 to MR8 of the message queue 131 may be popped to the second core 112 in sequence. That is, each time a message is popped, an address of the memory region in which the message is stored may change. The second core 112 may change the address for executing the load instruction each time a message pops. When this occurs, computational load of the second core 112 may increase.

In an example embodiment, the second core 112 may repeatedly provide a load instruction to the reference memory region to pop messages, and the second address allocator 122 may perform an address translation operation such that the messages may be obtained from the plurality of memory regions MR1-MR8 in sequence the number of times the store instruction is provided. Similar to the first address allocator 121, the second address allocator 122 may perform an address translation operation such that a memory region having an offset determined according to the number of time a store instruction is provided from the reference memory region each time the store instruction is provided for the reference memory region.

In an example embodiment, when the first core 111 and the second core 112 transmit and receive a message, the computational burden of the first core 111 for providing a store instruction and computational burden for the second core 112 for providing a load instruction may be reduced. For example, the number of instruction cycles for an address translation operation may be reduced. Accordingly, IPC performance between the plurality of cores 111 and 112 may increase, and thus, data processing performance of the multi-core processor 100 may increase.

FIG. 2 illustrates an example in which the message queue 131 is implemented as a linear queue. However, example embodiments of the present disclosure are not limited thereto. FIG. 3 illustrates an example in which a message queue 132 is implemented as a circular queue. However, example embodiments of the present disclosure are not limited thereto.

The message queue 132 in FIG. 3 may include a plurality of memory regions MR1-MR8. The plurality of memory regions MR1-MR8 may have addresses in a continuous range. A shaded region in FIG. 3 indicates a memory region in which messages are stored. For example, messages may be pushed in sequence and may be stored in the first to third memory regions MR1-MR3. Messages stored in the first to third memory regions MR1-MR3 may be popped in sequence. When a message stored in a certain memory region is popped, the message may be removed from the memory region.

When the message queue 132 is a circular queue, as shown in FIG. 3, the message may be stored in the eighth memory region MR8, and messages may be stored in sequence from the first memory region MR1 again.

In an example embodiment, when the cores 111 and 112 repeatedly perform an access operation on the reference memory region, the address allocators 121 and 122 may perform address translation based on an access count for the reference memory region. Accordingly, even when the cores 111 and 112 do not perform an address translation operation each time to access the plurality of memory regions MR1-MR8, the cores 111 and 112 may access the plurality of memory regions MR1-MR8 in sequence.

When the message queue 132 is a circular queue, the address allocators 121 and 122 may initialize the access count each time the access count is equal to a depth of the queue, that is, the number of memory regions. Accordingly, the cores 111 and 112 may access the eighth memory region MR8 and may access the first memory region MR1 again in sequence.

Hereinafter, the structure and operation of the address allocator according to an example embodiment will be described in greater detail with reference to FIGS. 4 to 6.

Figure 4:
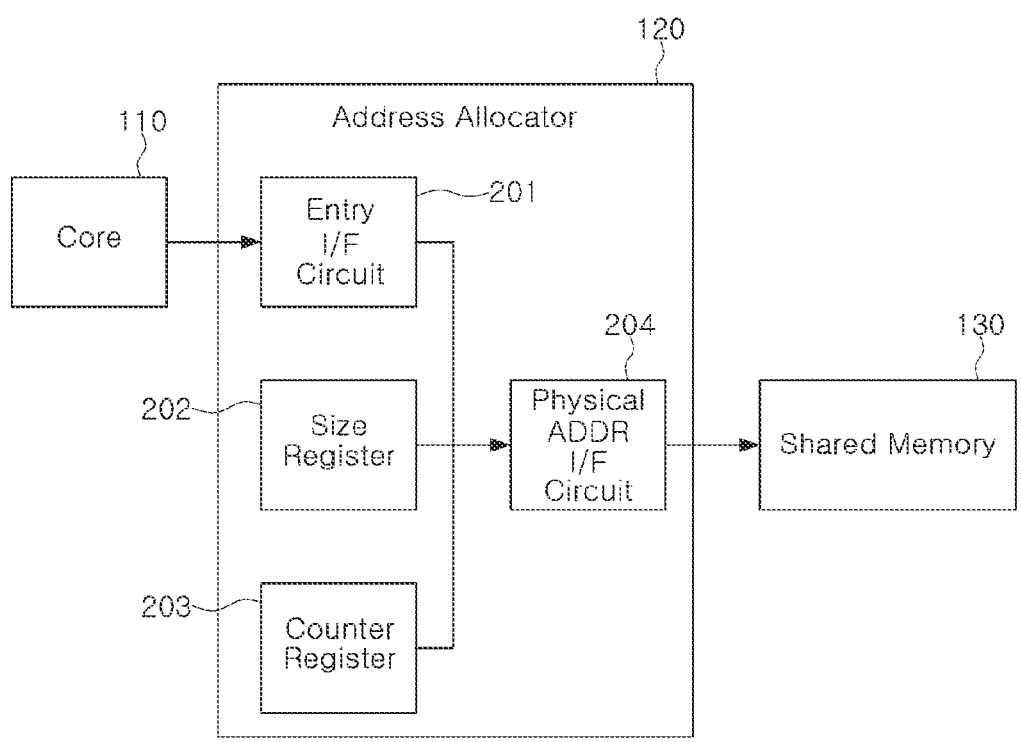
FIG. 4 is a block diagram illustrating a structure of an address allocator according to an example embodiment of the present disclosure.

FIG. 4 is a block diagram illustrating a structure of an address allocator according to an example embodiment.

FIG. 4 illustrates a core 110, an address allocator 120, and a shared memory 130. The core 110 may correspond to one of the plurality of cores 111 and 112 described with reference to FIG. 1. The address allocator 120 may correspond to one of the plurality of address allocators 121 and 122 described with reference to FIG. 1. The shared memory 130 may correspond to the example described with reference to FIG. 1.

The address allocator 120 may include an entry interface circuit 201, a size register 202, a counter register 203, and a physical address interface circuit 204.

The entry interface circuit 201 may receive addresses corresponding to an access instruction executed in the core 110. The addresses received by the entry interface circuit 201 from the core 110 may be addresses in a predetermined range corresponding to the reference memory region described with reference to FIG. 2. For example, for the core 110 to push one message, the core 110 may execute a store instruction for the addresses in the predetermined range in sequence, and the entry interface circuit 201 may receive the addresses in sequence.

The size register 202 may store size information of a memory region included in the message queue. The counter register 203 may store the access count of the reference memory region in the core 110.

The physical address interface circuit 204 may perform an address translation operation for translating an address received from the entry interface circuit 201 into an address to which the core 110 is actually accessing. For example, the physical address interface circuit 204 may translate the address received from the entry interface circuit 201 based on the size information stored in the size register 202 and the access count stored in the counter register 203.

The physical address interface circuit 204 may access a memory region having an offset determined according to the access count from the reference memory region in the shared memory 130 according to a result of the address translation operation.

Figure 5:
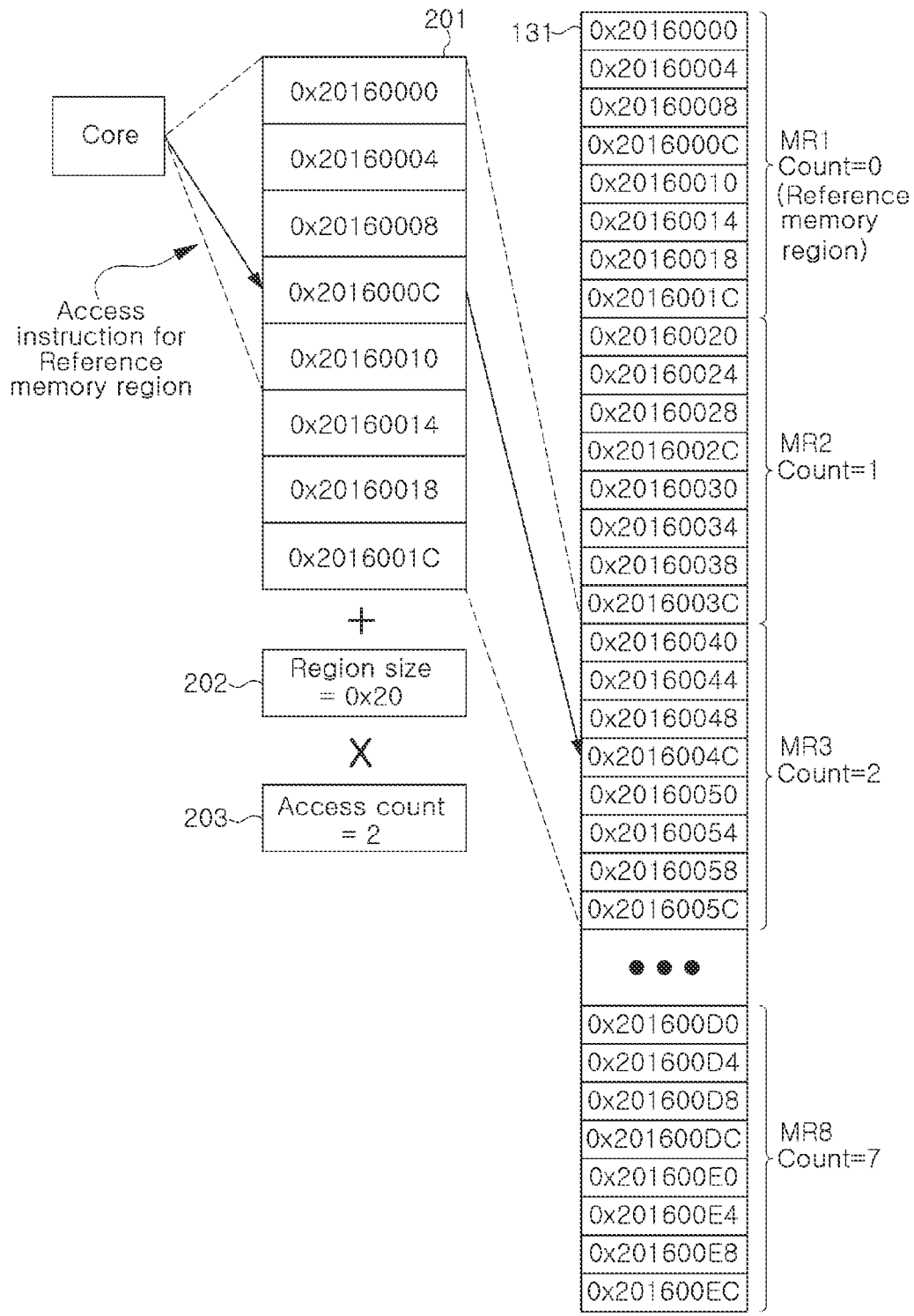
FIG. 5 is a block diagram illustrating operations of an address allocator according to an example embodiment of the present disclosure.

FIG. 5 is a block diagram illustrating operations of an address allocator according to an example embodiment.

FIG. 5 illustrates a core 110, an entry interface circuit 201, a size register 202, a counter register 203 and a message queue 131. The core 110, the entry interface circuit 201, the size register 202 and the counter register 203 may correspond to the examples described with reference to FIG. 4. The message queue 131 may correspond to the example described with reference to FIG. 2.

As described with reference to FIGS. 2 and 3, a message queue 131 having a plurality of memory regions MR1 to MR8 for transferring messages between cores may be allocated in the shared memory 130. FIG. 5 illustrates physical addresses of each of the memory regions MR1-MR8. Each of the memory regions MR1-MR8 may have a size of 32 bytes (0x20). The first memory region MR1 may have eight consecutive addresses 0x20160000-0x2016001C. The second memory region MR2 may have eight addresses 0x20160020-0x2016003C consecutive to the first memory region MR1. Similarly, the third to eighth memory regions MR3-MR8 may have addresses consecutive to each other.

The first memory region MR1 having an address having the smallest value among the plurality of memory regions MR1-MR8 may be the reference memory region. The core 110 may access the plurality of memory regions sequentially in sequence using eight addresses 0x20160000-0x2016001C corresponding to the first memory region MR1.

For example, when the core 110 stores the message in the message queue 131 twice and stores the message for the third time, the message may need to be stored in the third memory region MR3. Even when storing the message for the third time, the core 110 may execute a store instruction for eight addresses 0x20160000-0x2016001C corresponding to the first memory region MR1, which is the reference memory region.

The entry interface circuit 201 may receive eight addresses 0x20160000-0x2016001C in sequence from the core 110. The size register 202 may store "0x20", which is the size of the memory region, and the counter register 203 may store "2," which is the number of times the reference memory region has been accessed.

The address allocator 120 may translate the address received by the entry interface circuit 201 into an address having an offset equal to a value obtained by multiplying the size of the memory region by the number of accesses. For example, when the address "0x2016000C" is received from the core 110, the address allocator 120 may translate the address "0x2016000C" to the address "0x2016004C" by adding "0x40" obtained by multiplying "0x20" by 2 to "0x2016000C."

When the entry interface circuit 201 receives eight addresses 0x20160000-0x2016001C corresponding to the first memory region MR1 in sequence, the third memory region MR3 corresponding to addresses 0x20160040-0x2016005C having an offset of "0x40" from each of the eight addresses may be accessed in the message queue 131.

Figure 6:
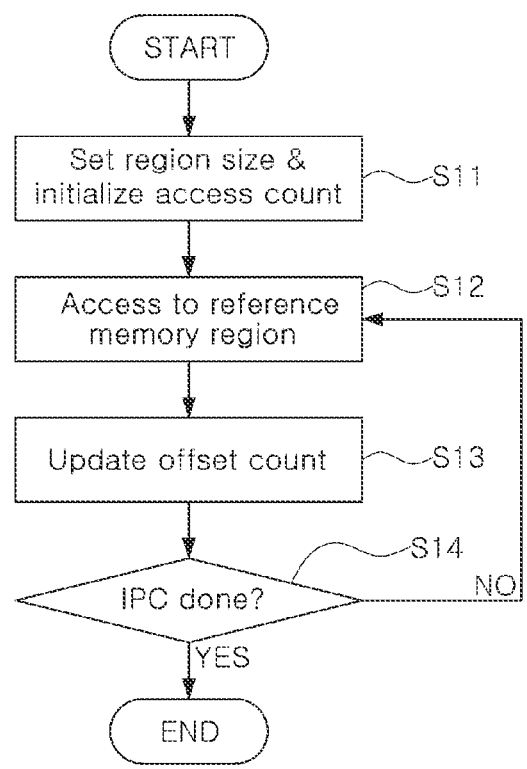
FIG. 6 is a flowchart illustrating a method of operating an IPC operation of a multi-core processor according to an example embodiment of the present disclosure.

FIG. 6 is a flowchart illustrating a method of operating an IPC operation of a multi-core processor according to an example embodiment.

In operation S11, the address allocator 120 may determine the size information of the memory region in the size register 202, and may initialize the access count in the counter register 203.

In operation S12, the core 110 may access the reference memory region. As a first example, to store a message in the shared memory 130, the core 110 may execute store instructions for addresses included in the reference memory region in sequence. As a second example, the core 110 may execute load instructions for addresses included in the reference memory region to obtain a message from the shared memory 130.

In operation S13, the address allocator 120 may update the access count of the counter register 203.

In operation S14, the core 110 may determine whether to complete the IPC. That is, the core 110 may determine whether all messages to be transferred to other cores have been transferred or whether all messages stored in memory regions of the shared memory 130 have been obtained.

When it is determined to complete the IPC ("YES" in operation S14), the multi-core processor 100 may terminate the IPC.

When the IPC is not completed ("NO" in operation S14), the multi-core processor 100 may repeat operations S12 and S13.

For example, in operation S12, the core 110 may access the reference memory region again. The address allocator 120 may perform address translation such that a memory region having an offset from the reference memory region may be accessed based on the updated access count. Thereafter, the access count may be updated again in operation S13.

Figure 7:
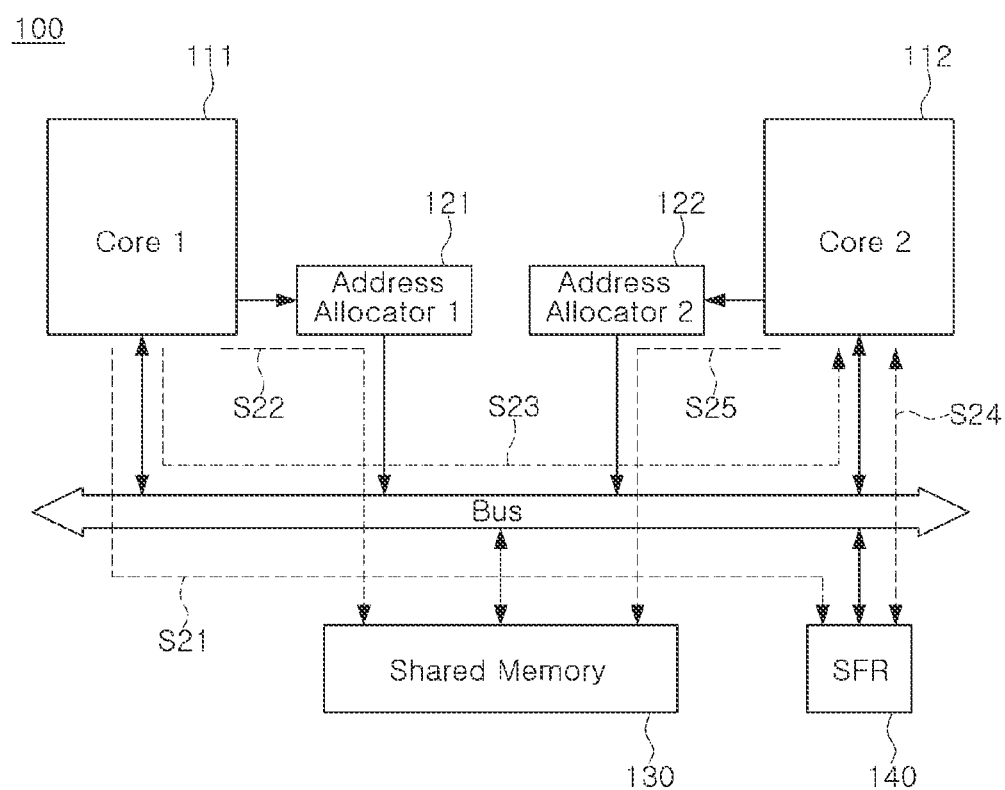
FIGS. 7 and 8 are block diagrams illustrating an operation of exchanging messages between a plurality of cores using an address allocator according to an example embodiment of the present disclosure.
Figure 8:
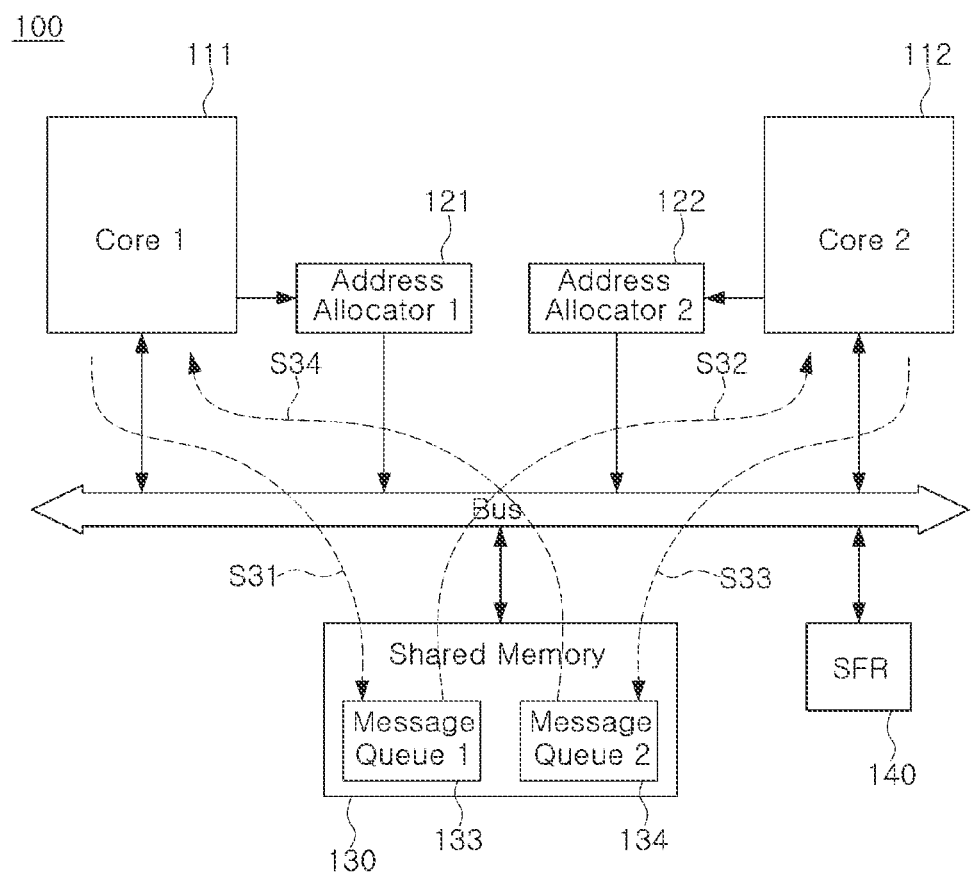

FIGS. 7 and 8 are block diagrams illustrating an operation of exchanging messages between a plurality of cores using an address allocator according to an example embodiment.

FIG. 7 illustrates a multi-core processor 100. The multi-core processor 100 in FIG. 7 may include the same components as those of the multi-core processor 100 described with reference to FIG. 1, and may further include a special function register 140 (SFR). The SFR 140 may be configured as a register storing setting values for controlling operations of the plurality of cores 111 and 112. In the example in FIG. 7, the SFR 140 may be shared by a plurality of cores 111 and 112. However, example embodiments of the present disclosure are not limited thereto.

FIG. 7 illustrates a flow of an operation in which the first core 111 transmits a message to the second core 112 through the address allocators 121 and 122.

In operation S21, a message queue including a plurality of memory regions from the shared memory 130 may be allocated to the first core 111. For example, a message queue may be allocated to the first core 111 when the multi-core processor 100 is initialized. The first core 111 may store address information of a reference memory region included in the message queue and size information of the memory regions in the SFR 140.

In operation S22, the first core 111 may sequentially store a plurality of messages in a plurality of memory regions of the shared memory 130 through the first address allocator 121. As illustrated in FIGS. 4 to 6, the first core 111 may repeatedly access the reference memory region to store a plurality of messages in sequence. The first address allocator 121 may perform address translation such that a message may be stored in a memory region having an offset determined according to an access count and a size of the memory region from the reference memory region. Accordingly, a plurality of messages may be stored in a plurality of memory regions of the shared memory 130 in sequence.

In operation S23, the first core 111 may provide an interrupt signal to the second core 112 to inform that the messages are stored in the shared memory 130.

In operation S24, the second core 112 may obtain the address of the reference memory region of the message queue allocated to the shared memory 130 and size information of the memory region by accessing the SFR 140.

In operation S25, the second core 112 may obtain a plurality of messages from the plurality of memory regions of the shared memory 130 in sequence through the second address allocator 122.

As described with reference to FIGS. 4 to 6, the second core 112 may repeatedly access the reference memory region to obtain a plurality of messages in sequence. The second address allocator 122 may perform address translation to load a message from a memory region having an offset determined according to an access count and a size of the memory region from the reference memory region. Accordingly, a plurality of messages may be obtained in sequence from the plurality of memory regions of the shared memory 130.

FIG. 8 illustrates a multi-core processor 100 as described with reference to FIG. 7. Referring to FIG. 8, a plurality of message queues 133 and 134 may be allocated to the shared memory 130. The first message queue 133 may be a message queue for transferring a message from the first core 111 to the second core 112, and the second message queue 134 may be a message queue for transferring a message from the second core 112 to the first core 111. Each of the plurality of message queues 133 and 134 may include a reference memory region having a different address.

Operations S31 and S32 may represent the flow of an operation in which the first core 111 transfers a message to the second core 112. In operation S31, the first core 111 may store a plurality of messages in sequence in the first message queue 133 using the first address allocator 121. In operation S32, the second core 112 may obtain a plurality of messages in sequence from the first message queue 133 using the second address allocator 122.

In an example embodiment, when the first and second cores 111 and 112 repeatedly access the reference memory region of the first message queue 133, the first and second address allocators 121 and 122 may perform an address translation operation, such that the first and second cores 111 and 112 may access the memory regions of the first message queue 133 in sequence.

Operations S33 and S34 represent the flow of the operation in which the second core 112 transfers a message to the first core 111. In operation S33, the second core 112 may sequentially store a plurality of messages in the second message queue 134 using the second address allocator 122. In operation S34, the first core 111 may sequentially obtain a plurality of messages from the second message queue 134 using the first address allocator 121.

In an example embodiment, when the first and second cores 111 and 112 repeatedly access the reference memory region of the second message queue 134, the first and second address allocators 121 and 122 may perform an address translation operation, such that the first and second cores 111 and 112 may access the memory regions of the first message queue 133 in sequence.

In an example embodiment, burden for an address translation operation for sequentially accessing a plurality of memory regions of the shared memory 130 by the first and second cores 111 and 112 may be reduced. Accordingly, IPC performance in the multi-core processor 100 may increase.

Hereinafter, an example of a system to which an example embodiment may be applied will be described with reference to FIGS. 9 to 11.

Figure 9:
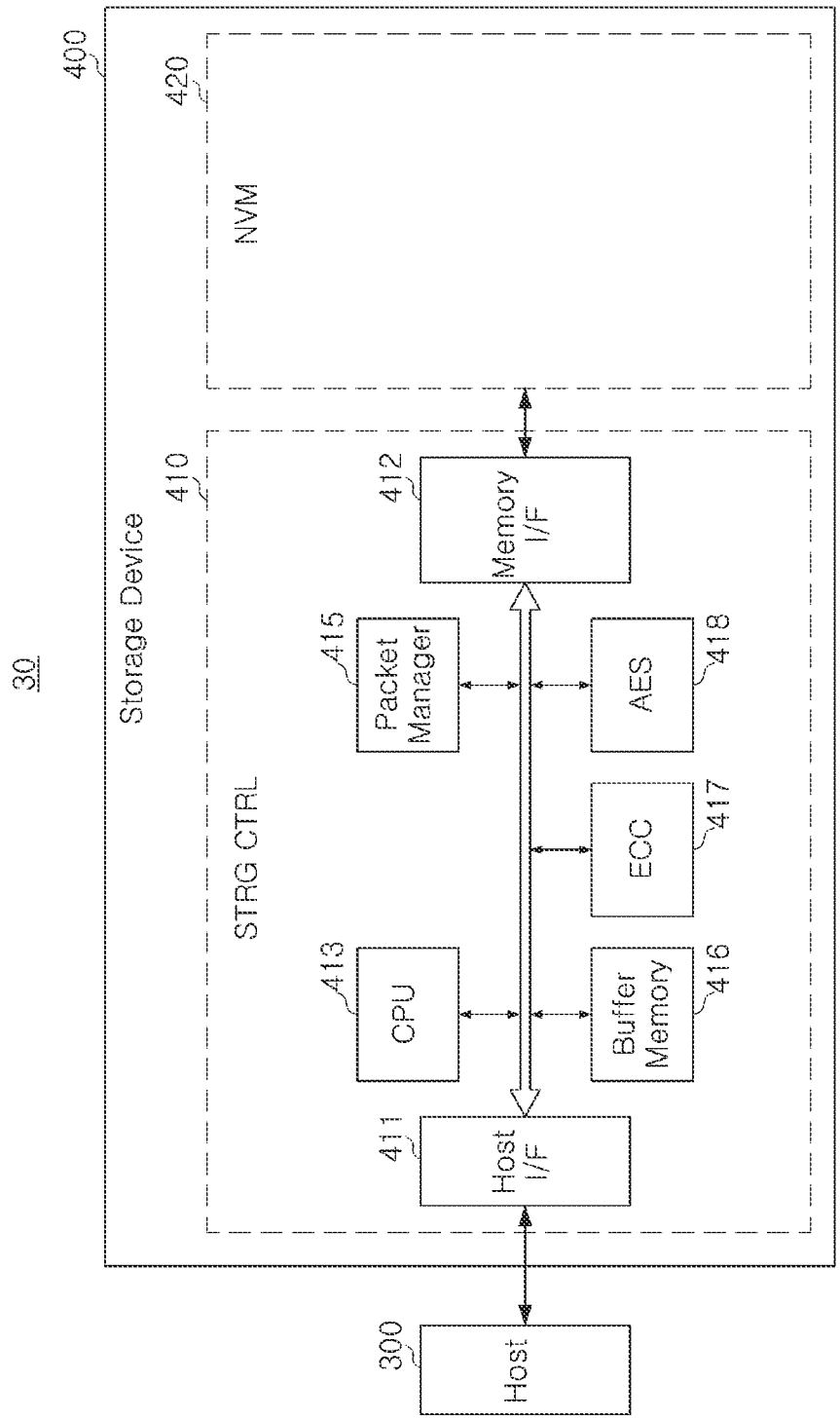
FIG. 9 is a block diagram illustrating a host-storage system according to an example embodiment of the present disclosure.

FIG. 9 is a block diagram illustrating a host-storage system according to an example embodiment.

The host-storage system 30 may include a host 300 and a storage device 400. The storage device 400 may include a storage controller 410 and a nonvolatile memory (NVM) 420.

The host 300 may include an electronic device, such as, for example, portable electronic devices such as a mobile phone, an MP3 player, a laptop computer, etc., or electronic devices such as a desktop computer, a game machine, a TV, a projector, etc. The host 300 may include at least one operating system (OS). The operating system may manage and control overall functions and operations of the host 300.

The storage device 400 may include storage media for storing data according to a request from the host 300. As an example, the storage device 400 may include at least one of a solid state drive (SSD), an embedded memory, and a removable external memory. When the storage device 400 is implemented as an SSD, the storage device 400 may be implemented as a device conforming to a nonvolatile memory express (NVMe) standard. When the storage device 400 is implemented as an embedded memory or an external memory, the storage device 400 may be implemented as a device conforming to universal flash storage (UFS) or embedded multi-media card (eMMC) standards. The host 300 and the storage device 400 may generate and transmit a packet according to a respective adopted standard protocol.

The nonvolatile memory 420 may maintain stored data even when power is not supplied. The nonvolatile memory 420 may store data provided from the host 300 through a program operation, and may output data stored in the nonvolatile memory 420 through a read operation.

When the nonvolatile memory 420 includes a flash memory, the flash memory may include a 2D NAND memory array or a 3D (or vertical) NAND (VNAND) memory array. As another example, the storage device 400 may include other types of nonvolatile memories. For example, the storage device 400 may include a magnetic RAM (MRAM), a spin-transfer torque MRAM (MRAM), a conductive bridging RAM (CBRAM), a ferroelectric RAM (FeRAM), a phase RAM (PRAM), a resistive RAM, and various other types of memories.

The storage controller 410 may control the nonvolatile memory 420 in response to a request from the host 300. For example, the storage controller 410 may provide data read from the nonvolatile memory 420 to the host 300, and may store data provided from the host 300 in the nonvolatile memory 420. For this operation, the storage controller 410 may support operations such as, for example, read, program, and erase operations of the nonvolatile memory 420.

The storage controller 410 may include a host interface 411, a memory interface 412, and a central processing unit (CPU) 413. The storage controller 410 may further include a packet manager 415, a buffer memory 416, an error correction code (ECC) 417 engine, and an advanced encryption standard (AES) engine 418. The storage controller 410 may further include a working memory into which firmware executed by the CPU 413 is loaded, and as the CPU 413 executes the firmware, data write and read operations for the nonvolatile memory 420 may be controlled.

The host interface 411 may transmit packets to and receive packets from the host 300. A packet transmitted from the host 300 to the host interface 411 may include, for example, a command or data to be written to the nonvolatile memory 420, and a packet transmitted from the host interface 411 to the host 300 may include, for example, a response to a command or data read from the nonvolatile memory 420.

The memory interface 412 may transmit data to be written to the nonvolatile memory 420 to the nonvolatile memory 420 or may receive data read from the nonvolatile memory 420. The memory interface 412 may be implemented to comply with a standard protocol such as a toggle or an open NAND flash interface (ONFI).

The packet manager 415 may generate a packet according to a protocol of the interface negotiated with the host 300 or may parse various types of information from the packet received from the host 300. The buffer memory 416 may temporarily store data to be written to or read from the nonvolatile memory 420. The buffer memory 416 may be provided in the storage controller 410. However, example embodiments are not limited thereto. For example, according to example embodiments, but the buffer memory 416 may be disposed external to the storage controller 410.

The ECC engine 417 may perform an error detection and correction function for readout data read from the nonvolatile memory 420. For example, the ECC engine 417 may generate parity bits for write data to be written into the nonvolatile memory 420, and the generated parity bits may be stored in the nonvolatile memory 420 along with write data. When data is read from the nonvolatile memory 420, the ECC engine 417 may correct an error in the read data using parity bits read from the nonvolatile memory 420 together with the read data, and may output the error-corrected read data.

The AES engine 418 may perform at least one of an encryption operation and a decryption operation for data input to the storage controller 410 using a symmetric-key algorithm.

The CPU 413 may be implemented as a multi-core processor including a plurality of cores. The storage controller 410 may have a plurality of software hierarchical structures such as, for example, a host interface layer (HIL), a flash translation layer (FTL), and a flash interface layer (FIL). Each of the plurality of cores may perform HIL, FTL, and FIL operations in a divided manner. Inter-layer communication may be performed by exchanging messages between a plurality of cores. Hereinafter, a method for performing communication between software layers in a storage controller will be described in greater detail according to an example embodiment.

Figure 10:
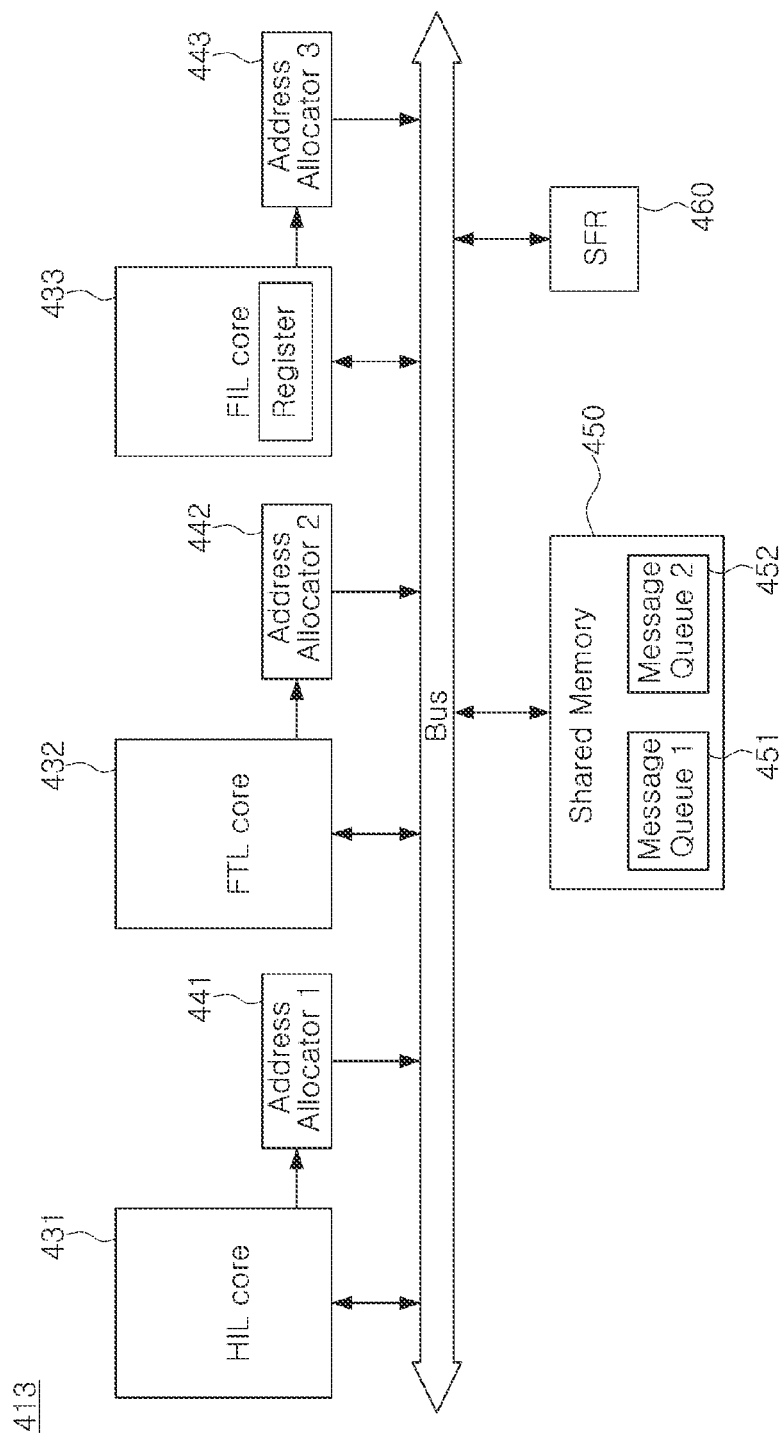
FIG. 10 is a block diagram illustrating a structure of a CPU included in a storage controller according to an example embodiment of the present disclosure.

FIG. 10 is a block diagram illustrating a structure of a CPU included in a storage controller according to an example embodiment.

Referring to FIG. 10, the CPU 413 may include a plurality of cores 431, 432, and 433, a plurality of address allocators 441, 442, and 443, a shared memory 450 and an SFR 460.

The plurality of cores 431, 432, and 433 may include an HIL core 431 for driving HIL, an FTL core 432 for driving FTL, and an FIL core 433 for driving FIL.

The plurality of cores 431, 432, and 433 may perform different tasks utilized to process one access command in a divided manner. For example, the HIL core 431 may control the host interface 411 and may process an access command from the host 300. The FTL core 432 may perform address mapping between a logical address provided from the host 300 and a physical address of the nonvolatile memory 420.

The FIL core 433 may manage a read operation and a write operation for the nonvolatile memory 420.

When the plurality of cores 431, 432, and 433 perform tasks to process one input/output command in a divided manner, the CPU 413 may perform IPC. That is, a message(s) may be exchanged between the plurality of cores 431, 432, and 433.

The shared memory 450 may have a message queue shared by a plurality of cores 431, 432, and 433, and may support message transfer between the plurality of cores 431, 432, and 433. In the example in FIG. 10, the shared memory 450 may include first and second message queues 451 and 452.

For example, when the HIL core 431 stores a plurality of messages in a plurality of memory regions included in the message queue in sequence, the FTL core 432 may access the plurality of memory regions in sequence and may obtain the plurality of messages.

The plurality of cores 431, 432, and 433 may perform an address translation operation each time a plurality of memory regions in sequence are accessed. When this occurs, the IPC performance of the CPU 413 may decrease. Increasing the IPC performance of the CPU 413 may increase the access performance of the storage device 400.

In an example embodiment, the plurality of address allocators 441, 442, and 443 may perform an address translation operation such that the plurality of cores 431, 432, and 433 may transmit and receive messages quickly. When the plurality of cores 431, 432, and 433 repeatedly perform an access operation on predetermined addresses of a reference memory region among a plurality of memory regions included in the message queue, the plurality of address allocators 441, 442, and 443 may support a plurality of cores 431, 432, and 433 to access the plurality of memory regions included in the message queue in sequence by performing an address translation operation. For example, each of the plurality of address allocators 441, 442, and 443 may perform an address translation operation such that a memory region having a predetermined offset from the reference memory region may be accessed based on an access count for the reference memory region of each message queue.

The SFR 460 may store setting values for controlling operations of the plurality of cores 431, 432, and 433. For example, the SFR 460 may store address information of a reference memory region of each of the first and second message queues 451 and 452 and size information of the memory region. In example embodiments, the SFR 460 may be shared by the plurality of cores 431, 432, and 433, and the plurality of cores 431, 432, and 433 may share information on a message queue by accessing the SFR 460.

In an example embodiment, since the IPC performance of the CPU 413 may increase, data processing performance of the storage device 400 may also increase.

For example, when the host interface 411 receives an access command and a logical address from the host 300, the HIL core 431 may generate a plurality of first messages requesting to translate the logical address into a physical address, and may repeatedly perform a store instruction for the reference memory region of the first message queue 451 on the plurality of first messages. The first address allocator 441 may perform an address translation operation such that the plurality of first messages may be be stored in a plurality of memory regions included in the first message queue 451 in sequence based on an access count of the HIL core 431 with respect to the reference memory region of the first message queue 451.

The FTL core 432 may repeatedly perform a load instruction for the reference memory region of the first message queue 451. The second address allocator 442 may perform an address translation operation such that the plurality of first messages may be output from a plurality of memory regions of the first message queue 451 in sequence based on the access count of the FTL core 432 with respect to the reference memory region of the first message queue 451.

The FTL core 432 may translate the logical address into a physical address in response to the plurality of output first messages, and may generate a plurality of second messages requesting an internal command for allowing the nonvolatile memory 420 to access the physical address. The FTL core 432 may repeatedly perform a store instruction for the reference memory region of the second message queue 452 on the plurality of second messages. The second address allocator 442 may perform an address translation operation such that the plurality of second messages may be stored in the plurality of memory regions of the second message queue 452 based on the access count of the FTL core 432 with respect to the reference memory region of the second message queue 452.

The FIL core 433 may repeatedly perform a load instruction for the reference memory region of the second message queue 452. The third address allocator 443 may perform an address translation operation such that the plurality of second messages may be output from the plurality of memory regions of the second message queue 452 based on the access count of the FTL core 432 with respect to the reference memory region of the second message queue 452. The FIL core 433 may generate an internal command for allowing the nonvolatile memory 420 to access the physical address in response to the plurality of output second messages, and may provide the internal command to the nonvolatile memory 420.

In an example embodiment, since the IPC performance of the CPU 413 may increase, the plurality of cores 431, 432, and 433 may quickly perform tasks for processing a command from the host 300. Accordingly, data processing performance of the storage device 400 may increase.

Figure 11:
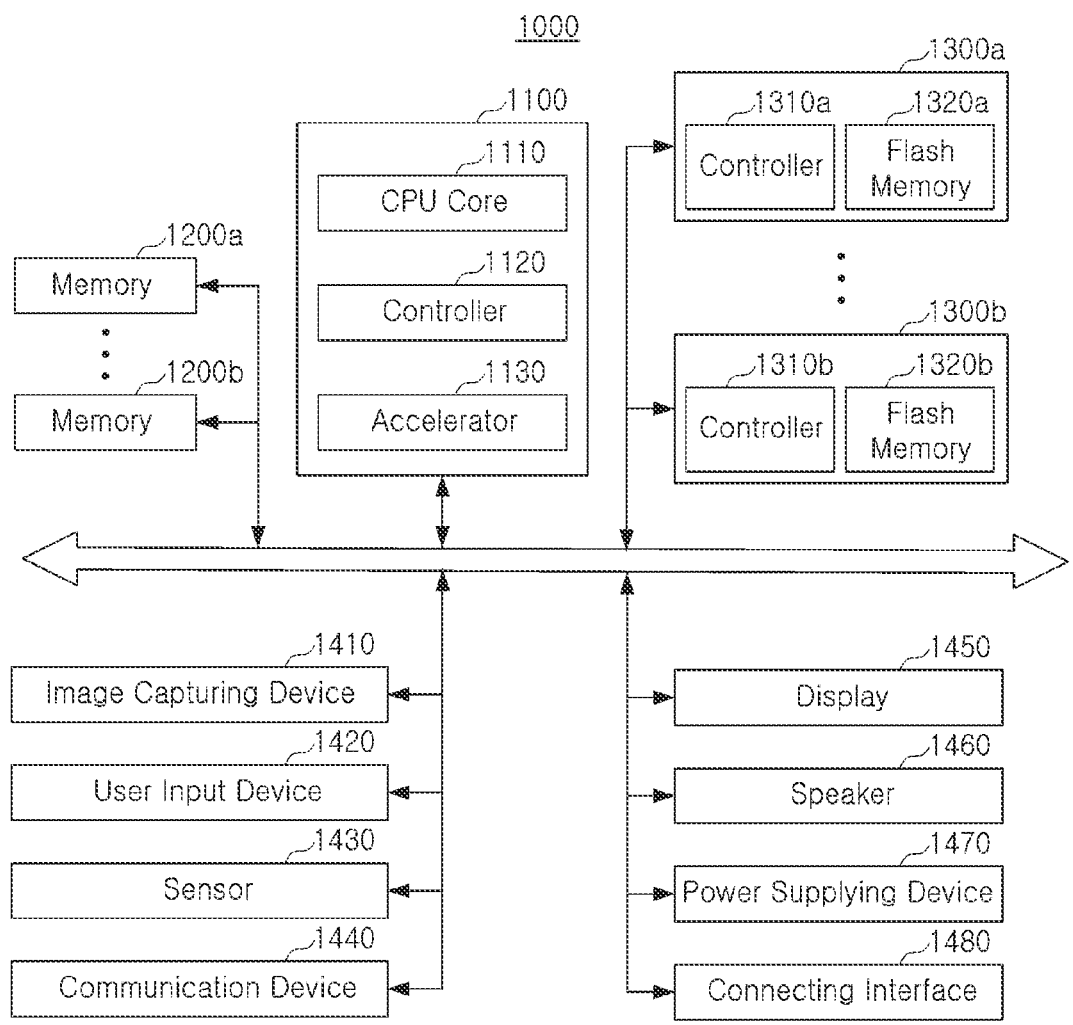
FIG. 11 is a diagram illustrating a system to which a storage device is applied according to an example embodiment of the present disclosure.

FIG. 11 is a diagram illustrating a system to which a storage device is applied according to an example embodiment.

The system 1000 in FIG. 11 may be implemented as a mobile system such as, for example, a mobile phone, a smartphone, a tablet personal computer, a wearable device, a healthcare device, or an Internet of things (IOT) device. However, the system 1000 in FIG. 11 is not necessarily limited to a mobile system, and may be implemented as other devices such as, for example, a personal computer, a laptop computer, a server, a media player, or an automotive device such as navigation.

Referring to FIG. 11, the system 1000 may include a main processor 1100, memories 1200a and 1200b, and storage devices 1300a and 1300b, and may further include at least one of an image capturing device 1410, a user input device 1420, a sensor 1430, a communication device 1440, a display 1450, a speaker 1460, a power supply device 1470 and a connection interface 1480.

The main processor 1100 may control overall operations of the system 1000 including, for example, operations of other components included in the system 1000. The main processor 1100 may be implemented as, for example, a general-purpose processor, a dedicated processor, or an application processor.

The main processor 1100 may include one or more CPU cores 1110, and may further include a controller 1120 for controlling the memories 1200a and 1200b and/or the storage devices 1300a and 1300b. In example embodiments, the main processor 1100 may further include an accelerator 1130 which is a dedicated circuit for high-speed data operation such as artificial intelligence (AI) data operation. Such an accelerator 1130 may include, for example, a graphics processing unit (GPU), a neural processing unit (NPU), and/or a data processing unit (DPU), and may be implemented as a chip independent from other components of the main processor 1100.

In example embodiments, the main processor 1100 may be implemented as a multi-core processor including a plurality of CPU cores and a shared memory shared by the plurality of CPU cores. A plurality of CPU cores may transmit and receive messages using a message queue allocated to the shared memory.

In an example embodiment, the main processor 1100 may further include a plurality of address allocators corresponding to the plurality of CPU cores. When the CPU core repeatedly accesses the reference memory region of the message queue, the address allocator corresponding to the CPU core may access the plurality of memory regions based on the number of accesses in sequence. Since the address translation operation may not be performed when the CPU core stores a plurality of messages in the message queue, a message transmission speed between CPU cores may increase.

The memories 1200a and 1200b may be used as main memory devices of the system 1000, and may include volatile memory such as, for example, SRAM and/or DRAM, or may include non-volatile memories such as, for example, a flash memory, PRAM and/or RRAM. The memories 1200a and 1200b may be implemented in the same package as the main processor 1100.

The storage devices 1300a and 1300b may function as nonvolatile storage devices storing data regardless of whether power is supplied, and may have a relatively large storage capacity compared to the memories 1200a and 1200b. The storage devices 1300a and 1300b may include storage controllers 1310a and 1310b and nonvolatile memory (NVM) 1320a and 1320b for storing data under control of the storage controllers 1310a and 1310b. The nonvolatile memories 1320a and 1320b may include a flash memory having a 2-dimensional (2D) structure or a 3-dimensional (3D) Vertical NAND (V-NAND) structure, or may include other types of memory such as PRAM and/or RRAM.

The storage devices 1300a and 1300b may be included in the system 1000 in a state of being physically separated from the main processor 1100, or may be implemented in the same package as the main processor 1100. Since the storage devices 1300a and 1300b have the same form as a solid state device (SSD) or a memory card, such that the storage devices 1300a and 1300b may be coupled to be attached to and detached from the other components of the system 1000 through an interface. Standard protocols such as, for example, Universal Flash Storage (UFS), embedded multimedia card (eMMC), or nonvolatile memory express (NVMe) may be applied to the storage devices 1300a and 1300b, but example embodiments of the present disclosure are not limited thereto.

In an example embodiment, the storage devices 1300a, 1300b may include a multi-core processor. The multi-core processor may include a plurality of cores, a shared memory including a plurality of memory regions for transferring messages between the plurality of cores, and a plurality of address allocators. The plurality of address allocators may be configured to, when a corresponding core of the plurality of cores repeatedly accesses a reference memory region among the plurality of memory regions, perform address translation according to the number of the access, and to control the corresponding core to access the memory regions in sequence. In an example embodiment, IPC performance of the multi-core processor may increase, and accordingly, data processing performance of the storage devices 1300*a* and 1300*b* may increase.

The image capturing device 1410 may obtain a still image or a video, and may be implemented as, for example, a camera, a camcorder, and/or a webcam.

The user input device 1420 may receive various types of data input from the user of the system 1000, and may be implemented as, for example, a touch pad, a keypad, a keyboard, and a mouse, and/or a microphone.

The sensor 1430 may detect various types of physical quantities obtained from an external entity of the system 1000 and may convert the sensed physical quantities into electrical signals. The sensor 1430 may be implemented as, for example, a temperature sensor, a pressure sensor, an illuminance sensor, a position sensor, an acceleration sensor, a biosensor and/or a gyroscope sensor.

The communication device 1440 may transmit and receive signals between other devices external to the system 1000 according to various communication protocols. The communication device 1440 may include, for example, an antenna, a transceiver, and/or a modem (MODEM).

The display 1450 and the speaker 1460 may function as output devices for outputting visual information and auditory information to a user of the system 1000, respectively.

The power supply device 1470 may appropriately convert power supplied from a battery and/or an external power source embedded in the system 1000 and may supply the power to each component of the system 1000.

The connection interface 1480 may provide a connection between the system 1000 and an external device connected to the system 1000 and exchange data with the system 1000. The connection interface 1480 may be implemented as various interface methods, such as, for example, an advanced technology attachment (ATA), serial ATA (SATA), external SATA (e-SATA), small computer small interface (SCSI), serial attached SCSI (SAS), peripheral component interconnection (PCI), PCIe (PCI express), NVMe, IEEE 1394, universal serial bus (USB), secure digital (SD) card, multi-media card (MMC), eMMC, UFS, embedded universal flash storage (eUFS), or compact flash (CF) card interface.

According to example embodiments, a multi-core processor and a storage device including the multi-core processor may be provided.

In a multi-core processor, an address translation operation performed each time a core accesses a shared memory may be performed by an address allocator separately provided from the core instead. Accordingly, computational burden on the core may be reduced and the cores may quickly access the shared memory.

Since IPC between cores may be quickly performed, performance of the multi-core processor may increase, and as a result, a data processing speed of a storage device including the multi-core processor may increase.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

In example embodiments of the present disclosure, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an example embodiment of the present disclosure, the 3D memory array includes vertical NAND strings that are vertically oriented such that at least one memory cell is located over another memory cell. The at least one memory cell may include a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

While the present disclosure has been particularly shown and described with reference to example embodiments thereof, it will be understood by those of ordinary skill in the art that various changes in form and detail may be made therein without departing from the spirit and scope of the present disclosure as defined by the following claims.

What is claimed is:

1. A multi-core processor, comprising:
a plurality of cores;
a shared memory having a message queue comprising a plurality of memory regions that transmit messages between the plurality of cores;
a plurality of address allocators configured to, each time addresses in a predetermined range corresponding to a reference memory region among the plurality of memory regions are received from a corresponding core among the plurality of cores, determine an offset based on size information of one of the plurality of memory regions and an access count of the reference memory region, and perform address translation by applying the offset to the addresses in the predetermined range,
wherein each of the plurality of address allocators comprises a size register configured to store the size information of the one of the plurality of memory regions, a counter register configured to store the access count, and a physical address interface circuit configured to determine the offset based on the size information and the access count,
wherein the plurality of memory regions are accessed in sequence based on the address translation; and a bus configured to connect the plurality of cores, the shared memory, and the plurality of address allocators to one another.

2. The multi-core processor of claim 1, wherein the plurality of memory regions have a same size and have addresses in a consecutive range.

3. The multi-core processor of claim 2, wherein the reference memory region has addresses having a smallest value among the plurality of memory regions.

4. The multi-core processor of claim 2, wherein each of the plurality of address allocators further comprises:
an entry interface circuit configured to receive the addresses in the predetermined range from the corresponding core,
wherein the physical address interface circuit is further configured to perform the address translation by applying the offset to each of the addresses in the predetermined range, and to access a memory region among the plurality of memory regions instructed by the translated addresses.

5. The multi-core processor of claim 4, wherein the physical address interface circuit is configured to perform the address translation by adding a value obtained by multiplying the size information by the access count.

6. The multi-core processor of claim 1, further comprising:
a special function register (SFR) configured to store the addresses in the predetermined range of the message queue and the size information of one of the plurality of memory regions among the plurality of memory regions,
wherein the SFR is shared by the plurality of cores.

7. The multi-core processor of claim 1,
wherein the message queue is configured as a circular queue, and
wherein each of the plurality of address allocators is configured to update the access count each time the addresses in the predetermined range are received, and each of the plurality of address allocators is configured to initialize the access count each time the updated access count is equal to a depth of the circular queue.

8. A storage device, comprising:
a memory device configured to store data; and
a storage controller configured to control the memory device,
wherein the storage controller comprises:
a plurality of cores, comprising:
a host interface layer (HIL) core configured to drive an HIL;
a flash translation layer (FTL) core configured to drive an FTL; and
a flash interface layer (FIL) core configured to drive an FIL;
a shared memory having a plurality of message queues that transfer messages between the plurality of cores; and
a plurality of address allocators configured to perform address translation operations such that the plurality of cores are able to access the shared memory, and
wherein one of the plurality of address allocators is configured to, when addresses for a reference memory region of one of the message queues are received from a corresponding core among the plurality of cores, perform the address translation operations such that a plurality of memory regions of the one message queue are accessed based on an access count of the reference memory region, wherein, in response to an access instruction received along with a logical address from a host, the HIL core is configured to generate a plurality of first messages requesting to translate the logical address into a physical address of the memory device, and to repeatedly perform a store instruction for the reference memory region, which corresponds to a first message queue among the plurality of message queues, on the plurality of first messages, and
wherein a first address allocator among the plurality of address allocators is configured to perform a first address translation operation among the address translation operations, such that the plurality of first messages are able to be stored in a plurality of memory regions of the first message queue in sequence based on an access count of the HIL core with respect to the reference memory region of the first message queue.

9. The storage device of claim 8,
wherein the FTL core is configured to repeatedly perform a load instruction for the reference memory region of the first message queue,
wherein a second address allocator among the plurality of address allocators is configured to perform a second address translation operation among the address translation operations, such that the plurality of first messages are able to be output from the plurality of memory regions of the first message queue in sequence based on an access count of the FTL core with respect to the reference memory region of the first message queue,
wherein the FTL core is configured to translate the logical address into the physical address in response to the plurality of first messages, to generate a plurality of second messages requesting to generate an internal instruction to access the physical address in the memory device, and to repeatedly perform a store instruction for a reference memory region of a second message queue among the plurality of message queues on the plurality of second messages, and
wherein the second address allocator is configured to perform a third address translation operation among the address translation operations, such that the plurality of second messages are able to be stored in a plurality of memory regions of the second message queue in sequence based on the access count of the FTL core with respect to the reference memory region of the second message queue.

10. The storage device of claim 8, wherein the shared memory is configured to allocate the plurality of message queues during an initialization operation of the storage device in response to a request from the plurality of cores.

11. A multi-core processor, comprising:
a plurality of cores;
a shared memory having a message queue comprising a plurality of memory regions that transmit messages between the plurality of cores,
wherein the plurality of memory regions have a same size and have addresses in a consecutive range;
a plurality of address allocators configured to, each time addresses in a predetermined range corresponding to a reference memory region among the plurality of memory regions are received from a corresponding core among the plurality of cores, control the plurality of memory regions to be accessed in sequence by applying an offset determined according to an access count of the reference memory region to the addresses in the predetermined range, wherein each of the plurality of address allocators comprises:
an entry interface circuit configured to receive the addresses in the predetermined range from the corresponding core;
a size register configured to store size information of one of the plurality of memory regions;
a counter register configured to store the access count; and
a physical address interface circuit configured to determine the offset based on the size information and the access count, to perform address translation by applying the offset to each of the addresses in the predetermined range, and to access a memory region among the plurality of memory regions instructed by the translated addresses; and
a bus configured to connect the plurality of cores, the shared memory, and the plurality of address allocators to one another.

12. The multi-core processor of claim 11, wherein the physical address interface circuit is configured to perform address translation by adding a value obtained by multiplying the size information by the access count.

13. The multi-core processor of claim 11, wherein the plurality of memory regions have a same size and have addresses in a consecutive range.

14. The multi-core processor of claim 13, wherein the reference memory region has addresses having a smallest value among the plurality of memory regions.

15. The multi-core processor of claim 11, further comprising:
a special function register (SFR) configured to store the addresses in the predetermined range of the message queue and the size information of one of the plurality of memory regions among the plurality of memory regions,
wherein the SFR is shared by the plurality of cores.

16. The multi-core processor of claim 11,
wherein the message queue is configured as a circular queue, and
wherein each of the plurality of address allocators is configured to update the access count each time the addresses in the predetermined range are received, and each of the plurality of address allocators is configured to initialize the access count each time the updated access count is equal to a depth of the circular queue.

* * * * *